Aug. 30, 1932.     G. W. SWIFT, JR     1,874,651
CLUTCH
Filed March 5, 1930     5 Sheets-Sheet 2

WITNESS
Oliver W. Holmes

Inventor
GEORGE W. SWIFT, JR.
By his Attorneys

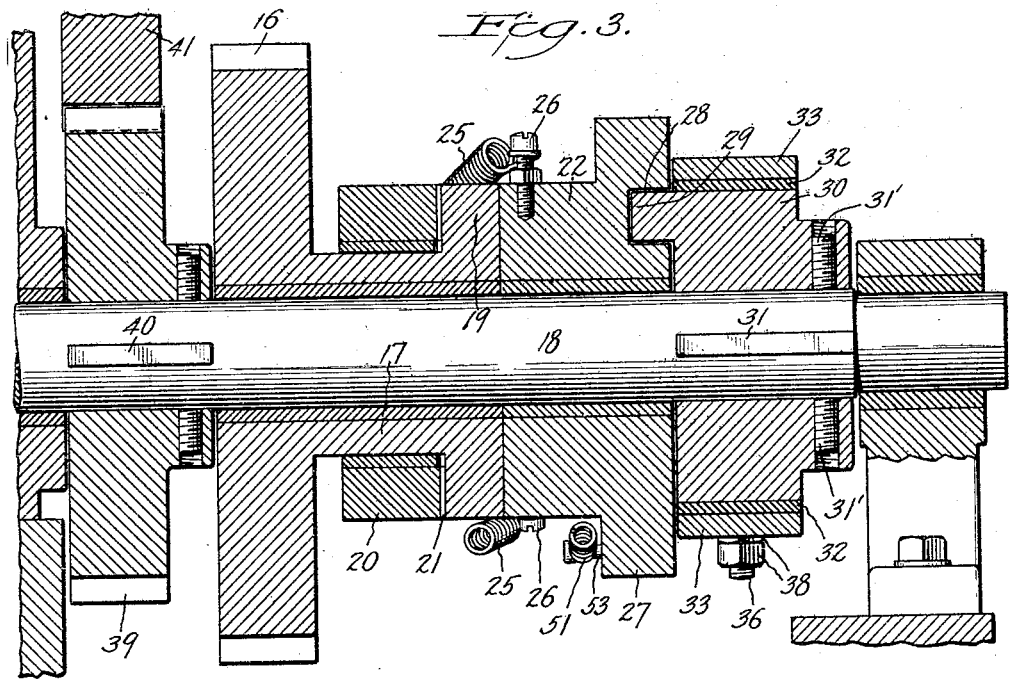
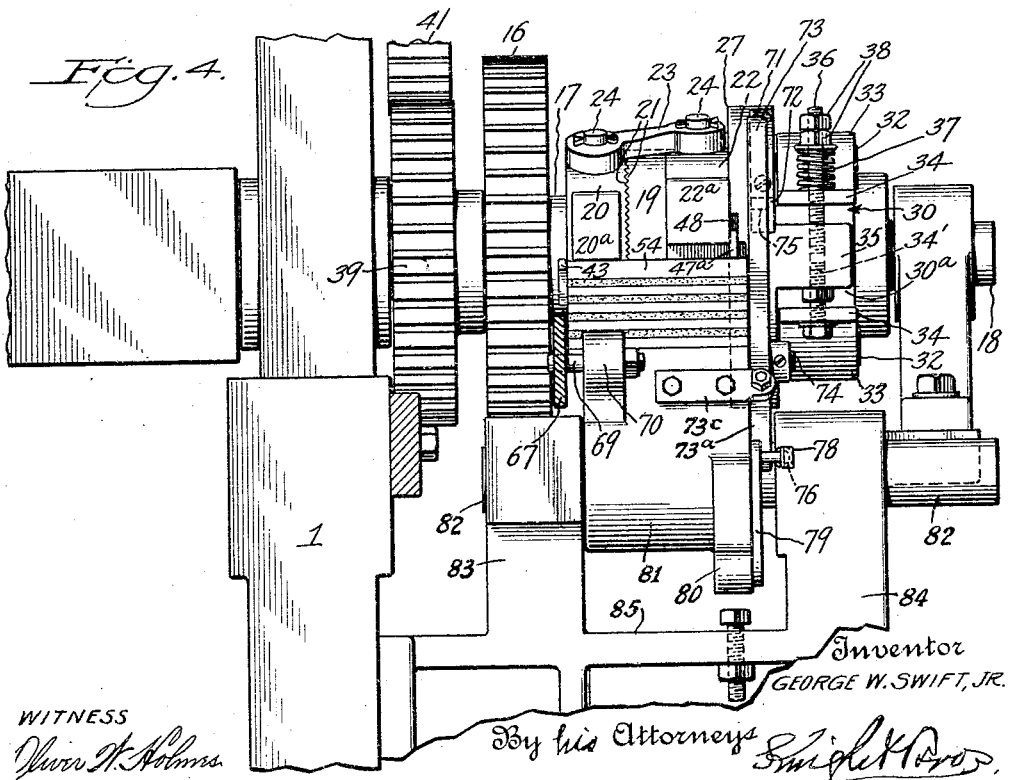

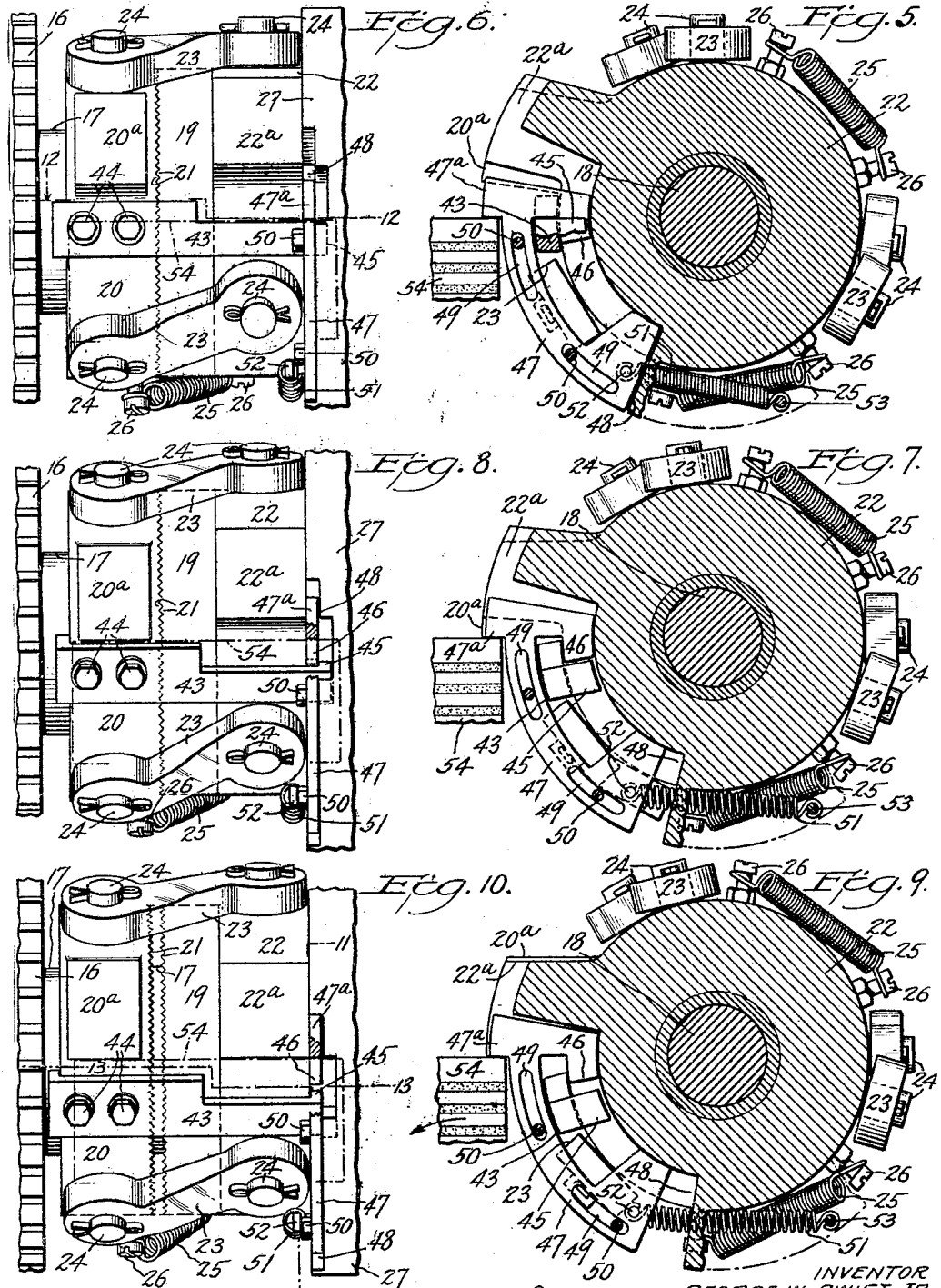

Aug. 30, 1932.   G. W. SWIFT, JR   1,874,651
CLUTCH
Filed March 5, 1930   5 Sheets-Sheet 5

WITNESS
Oliver W. Holmes

Inventor
GEORGE W. SWIFT, JR.
By his Attorneys

Patented Aug. 30, 1932

1,874,651

UNITED STATES PATENT OFFICE

GEORGE W. SWIFT, JR., OF BORDENTOWN, NEW JERSEY, ASSIGNOR TO GEORGE W. SWIFT, JR., INC., OF BORDENTOWN, NEW JERSEY, A CORPORATION OF NEW JERSEY

CLUTCH

Application filed March 5, 1930. Serial No. 433,259.

This invention relates more especially to clutches for automatically controlling the operations of a machine in which the proper timing of said operations affects the character of the work produced by said machine.

The primary object of my invention is to provide an improved construction and arrangement of parts in a clutch of this nature whereby a periodically operated mechanism may be started and stopped in accurately timed relation to the feed or travel of the stock or material which is being operated upon. In the form shown on the accompanying drawings, my invention contemplates an improved clutch for timing the periodic operations of rotary knives for cutting specified lengths of material from a web.

Further objects of my invention will appear in the specification and the particular features of construction appertaining thereto will be recited in the appended claims, reference being had to the accompanying drawings which show a preferred embodiment of my invention.

Figure 3 is a vertical section corresponding to the line 3—3 of Figure 2, parts being broken away and parts shown in plan.

Figure 4 is a front elevation of the clutch and connected parts.

Figure 5 is a section on the line 5—5 of Figure 2 showing the parts in their relative positions at the commencement of the clutch-releasing operation.

Figure 6 is a front elevation of the same.

Figure 7 is a section similar to Figure 5 showing the parts in their relative arrangements in a more advanced stage of the clutch-releasing operation.

Figure 8 is a front elevation of the same.

Figure 9 is a section similar to Figure 5 showing the relative arrangements of the parts at the completion of the clutch-releasing operation.

Figure 10 is a front elevation of the same.

Figure 1:
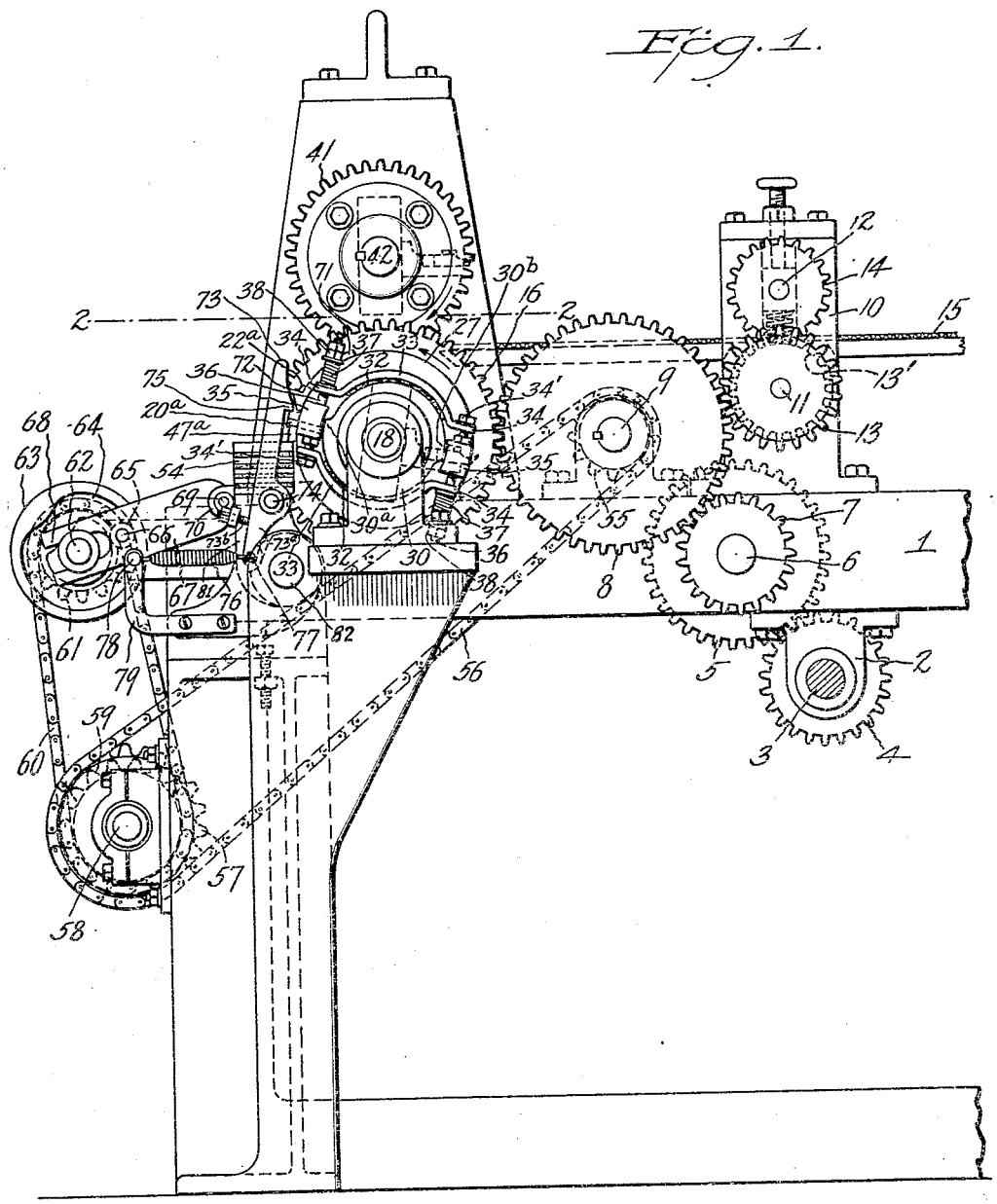
Figure 1 is a side elevation of a web-cutting mechanism provided with my improved clutch.

Figure 1 of the drawings shows in side elevation a web-cutting machine for corrugated boards or the like in which my improved clutch is made use of for accurately starting and stopping the web-cutting mechanism for the purpose of severing predetermined lengths of material from a continuous web of the corrugated board.

Referring to Figure 1 of the drawings, oppositely arranged side frames 1 (only one of which is shown) carry coaxially-arranged bearing brackets 2 (only one of which is shown). Journalled in said bearing brackets 2 is a power-driven shaft 3 to which is keyed a spur gear 4 which meshes with a larger spur gear 5. The spur gear 5 is keyed to a transverse shaft 6 which also carries a spur gear 7 meshing with a spur gear 8 keyed to a cross-shaft 9. Mounted upon the side frames 1 are oppositely-arranged standards 10 within which are journalled paired web-feeding rolls carried respectively by a lower feed roll shaft 11 and an upper feed roll shaft 12. The spur gear 8 meshes into a spur gear 13 which is keyed to the lower feed roll shaft 11. In order to have the upper and lower feed roll shafts 11 and 12 rotate in unison, suitable intermeshing spur gears 13' and 14 are keyed to said shafts and are adapted to produce a forward movement of the web at a predetermined speed consistent with the desired length of web-sections to be severed from the continuous web 15 by periodic operations of the cutting mechanism.

Clutch mechanism

Figure 2:
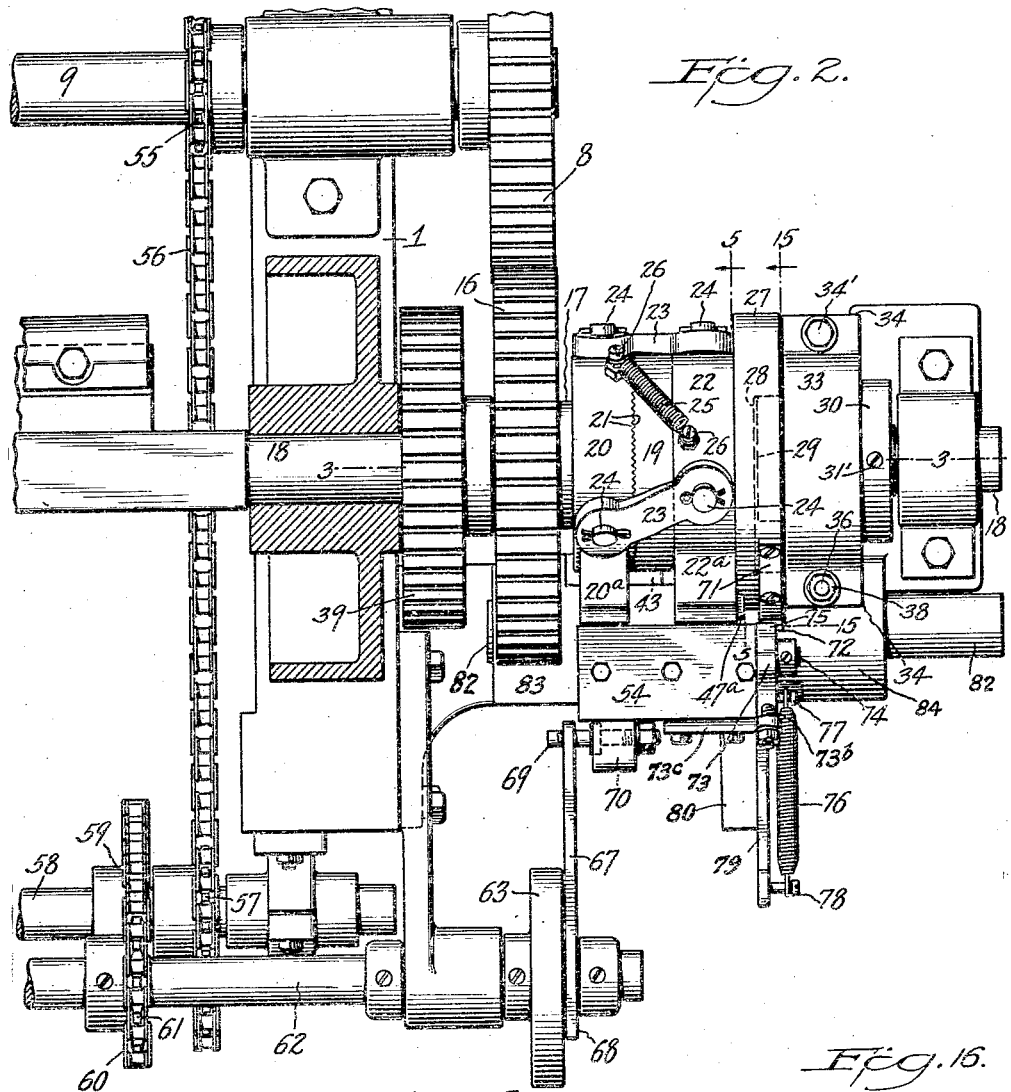
Figure 2 is a horizontal section corresponding to the line 2—2 of Figure 1, parts being shown in plan.

Referring more especially to Figures 1, 2 and 3, the spur gear 8 on transverse shaft 9 meshes with a spur gear 16 which, according to the present embodiment of my invention as shown in Figure 3 of the drawings, is integrally formed with an elongated sleeve 17 freely journalled upon a lower cutter shaft 18. Arranged at the opposite end of elongated sleeve 17 with respect to the gear 16 and preferably integral with said sleeve, is a clutch-disk 19. Journalled upon the sleeve 17 and movable axially thereon, is a clutch-ring 20, said clutch-disk 19 and clutch-ring 20 being provided with inter-engaging teeth 21. A driven clutch-part 22 which is freely journalled upon the lower cutter shaft 18 constitutes one part of a two-part driven clutch-member, the clutch-ring 20 constituting the other part thereof. Said clutch-parts 20 and 22 are connected in such a way that a relative angular movement between them produces a relative axial movement whereby the clutch-disk 19 and clutch-ring 20 may be thrown into and out of clutching engagement. For this purpose, these parts are connected by inextensible links 23 which have their opposite ends pivotally connected to the parts 20 and 22 by means of studs or pins 24. It will be understood from this description that whenever the clutch-ring 20 is oscillated on the sleeve 17, it will be moved into and out of engagement with the clutch-disk 19 by reason of changes in the inclination of links 23. Suitable means for yieldably drawing the clutch-ring 20 into engagement with the clutch-disk 19 may be provided by tension springs 25 secured at opposite ends to the respective parts of the two-part driven clutch member by means of studs 26. By an inspection of Figures 3, 15 and 16, it will be understood that the part 22 of the two-part driven clutch member is connected to the lower cutter shaft 18 by a limited lost-movement friction drive and brake.

As shown in Figures 1 and 3, the driven part 22 of the two-part driven clutch-member is provided with a peripheral enlargement 27 within the lateral wall of which is formed an arcuate recess 28. Movable to and fro within the arcuate recess 28 and adapted to abut rigidly against one or the other end walls of said arcuate recess, is a lug 29 which projects laterally from a friction driven or brake member 30 which is keyed to the shaft 18 by means of a key 31. Said friction driven or brake member 30 may be retained in axially adjusted position by means of suitable grubs 31 and comprises oppositely disposed lobes 30a and 30b of spiral form. Bearing inwardly on the lobes 30a and 30b through interposed straps or shoes 32, are part-circular straps or brake bands 33 with outwardly-deflected ends 34. One end of each of said straps or brake bands 33 is adjustably anchored by a stud 34′ to one or the other of a pair of oppositely-arranged blocks 35 formed by axially-presented integral portions of the peripheral enlargement 27 of the part 22 of the two-part driven clutch member. The other end of each strap or brake band 33 slidably engages another stud 36 which is threaded into the other block 35 and subjected to the pressure of a compression spring 37 applied by an adjustable abutment or nut 38 threaded to the outer end of the stud 36. As shown in Figure 3, a spur gear 39 is secured to the lower cutter shaft 18 by means of a key 40 and meshes with another spur gear 41 which is keyed to an upper cutter shaft 42.

Clutch-locking device

Figure 11:
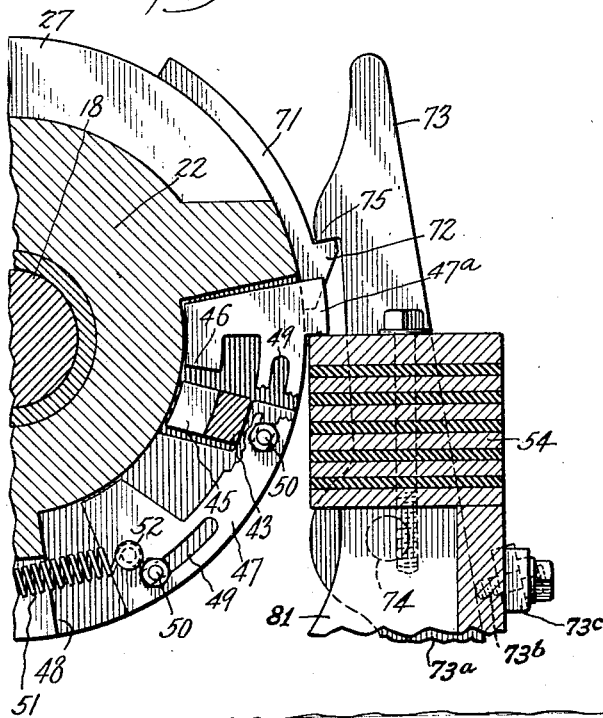
Figure 11 is a vertical section on the line 11—11 of Figure 10.
Figure 14:
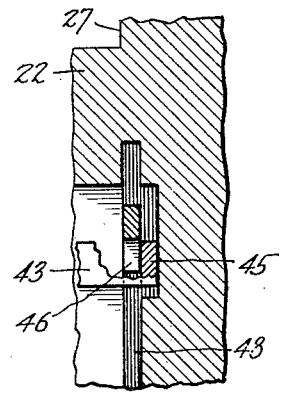
Figure 14 is a fragmentary section corresponding to the line 14—14 of Figure 12.
Figure 12:
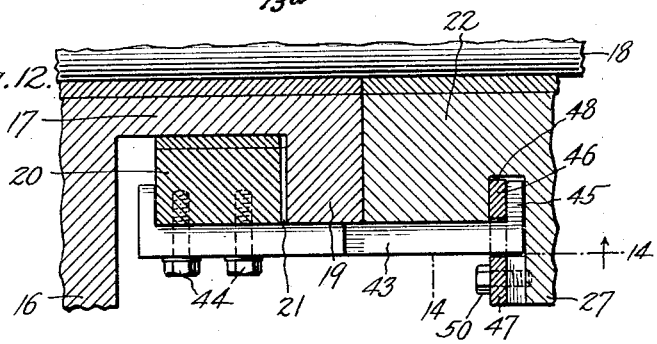
Figure 12 is a fragmentary section on an enlarged scale corresponding to the line 12—12 of Figure 6.
Figure 13:
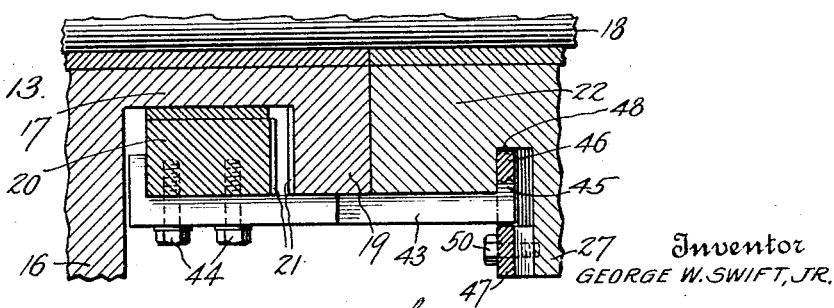
Figure 13 is a similar fragmentary section corresponding to the line 13—13 of Figure 10.

Suitable means for locking the clutch-ring 20 in clutch with the clutch-disk 19 under control of the starting and stopping movements of the web-cutting mechanism, may be provided as follows. As shown in Figures 6, 12 and 13, the clutch-ring 20 carries on its outer periphery a latch bar 43, said latch bar being rigidly secured to the clutch ring by means of bolts 44. The smaller outer end of said latch bar is provided with an inwardly-presented lug or deflected end 45 which is moved into and out of the path of a stop 46 carried by an arcuate latch ring 47 which is mounted within a suitable arcuate recess 48 formed in the enlargement 27 of the block 22 as shown in Figure 11. The arcuate latch plate is provided with arcuate slots 49 which serve as guides for the oscillatory movement of said latch plate on studs 50 which project through the slots 49. A yieldable tendency to move the arcuate latch plate 47 in a clockwise direction according to Figure 11, may be provided by a tension spring 51 which is secured at one end to a stud 52 on the latch plate 47 and at its other end to a laterally-presented stud 53 carried by the enlargement 27 of the part 22 of said two-part driven clutch member. It will be understood that whenever the clutch-ring 20 is thrown into clutching engagement with the clutch-disk 19 by the angular movement of said clutch-ring, the latch bar 43 is moved toward the right according to Figures 6, 12 and 13. This movement from its position shown in Figure 13 to its position shown in Figure 12, removes the inwardly-presented lug 45 on the end of the locking bar 43 from the path of lug 46 on the latch plate 47. This permits the tension spring 51 to draw the latch plate in a clockwise direction according to Figure 11 in such a way that the stop 46 on said latch plate is caused to bar the return movement of the locking bar 43. This operation is thus adapted to maintain a positive interlock between the clutch elements until a reverse movement of the arcuate latch plate 47 is produced in the manner now to be pointed out. As shown best in Figures 5, 7 and 9, the clutch-ring 20 is provided with an approximately radial projection 20a. The part 22 of the two-part driven clutch member, on the other hand, is provided with an approximately radial projection 22a. The arcuate latch plate 47 is provided with an approximately radial projection 47a. Each of these projecting portions 20a, 22a, and 47a of the members referred to is suitably formed to abut radially against an anvil 54 which, as shown in Figure 4 is mounted on the upper end of an oscillatory arm 81 and movable about the axis of a short shaft 82. Suitable means may be provided, as hereinafter described, for moving said anvil into and out of the paths of these projections for timing the operations of the web-cutting mechanism. The shaft 82 is mounted in suitable uprights 83 and 84 carried by a bracket 85 mounted on the main frame of the machine. It will be seen in Figure 5 that whenever the clutch-ring 20 is in clutch with the clutch-disk 19 as shown in Figure 6, that the radial abutment surfaces of the projections 20a, 22a and 47a are arranged out of alinement with respect to the upper surface of the anvil 54. On the other hand, when said projections are brought to rest and into alinement upon the upper surface of the anvil 54 as shown in Figure 9, the relative displacement of the clutch-ring 20 with respect to the part 22 of the two-part driven clutch member separates the clutch-ring 20 from the clutch-disk 19 under the constraint of the connecting links 23 as they move toward parallelism.

Clutch-controlling mechanism

Suitable mechanism for cooperatively controlling these members for making and breaking the clutch and thus accurately timing the starting and stopping of the web-cutting mechanism may be provided as follows. Referring to Figures 1 and 2, a sprocket-wheel 55 which is keyed to the cross-shaft 9, drives a sprocket-chain 56 which sprocket-chain also passes over a sprocket-wheel 57 on a transverse shaft 58. Also secured to the transverse shaft 58 and spaced axially from the sprocket-wheel 57, is a second sprocket-wheel 59 which drives a sprocket-chain 60 which runs over an upper sprocket-wheel 61 on a cam-shaft 62. Keyed to the outer end of cam-shaft 62 is a cam-disk 63 which is provided with a laterally-presented cam-groove 64. Travelling in the cam-groove 64 is a cam-roller 65 which is journalled on a stud 66 on the inner face of a cam-rod 67, said cam-rod being provided in its outer end with a guide slot 68 which oscillatably engages the shaft 62. The inner end of the cam-rod 67 is pivotally connected to one end of a stud 69 which is carried by a lug 70 which is presented rearwardly from the anvil 54. It will be understood from this description that during the continued operation of the web-cutting machine, the anvil 54 will be periodically moved into and out of the paths of the projections 20a, 22a and 47a for periodically starting and stopping the web-cutting mechanism. Suitable means for preventing a rebound of the clutch-member 22 after each operation may be provided as follows. As shown in Figures 1 and 11, the peripheral enlargement 27 of the intermediate clutch member 22 carries an arcuate strap 71 provided at its lower end with a latch dog 72. Cooperating with the latch-dog 72 is a latch-arm 73, said latch-arm being pivoted at 74 on an oscillatory arm 81 which carries the stop or anvil 54. For this purpose, said latch-arm is provided above with a claw 75 which snaps into engagement with the dog 72 as the projection 22a strikes the anvil each time. As shown in Figure 1, a tension spring 76 is connected at one end to a depending portion of the latch-arm, the other end of said spring being connected at 78 to a bent bracket arm 79 which is secured to a rearwardly projecting lug 80 on the oscillatory arm 81. The clockwise movement of the latch-arm 73 may be limited by an adjustable stop 73b on the outer end of a bar 73c carried by the oscillatory arm 81.

Operation

Figure 15:
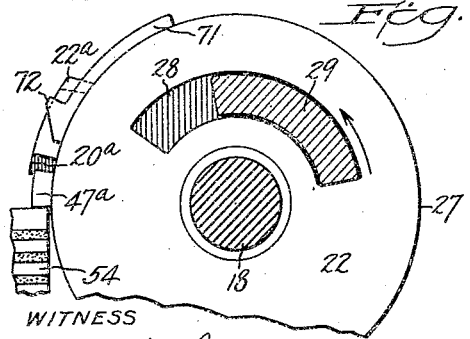
Figure 15 is a vertical section on the line 15—15 of Figure 2.
Figure 16:
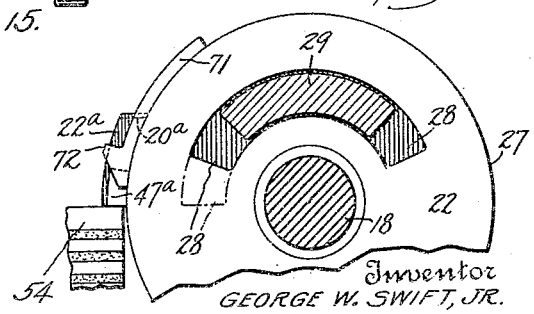
Figure 16 is a vertical section similar to Figure 15 with the parts in changed positions.

When the upper and lower cutter shafts 42 and 18 are initially at rest, the clutch-parts with their operating connections will occupy the positions shown in Figures 9 and 10 of the drawings. In this position of the parts, the arcuate latch-plate 47 is held in release position by means of the projecting portion 47a of said latch-plate which then rests upon the anvil 54. At the same time, the projecting portions 20a and 22a of the clutch-ring 20 and clutch-part 22, respectively, will also rest upon the anvil 54 so that the clutch-ring will be held in its rearmost angular position with respect to clutch-part 22 in spite of the pull exerted by tension springs 25. Under these conditions, the connecting links 23 are in their positions nearest to parallelism with respect to the axis of lower cutter-shaft 18. In consequence, the clutch-ring 20 is retained in a position in which it is axially displaced from the clutch disk 19, thus permitting the spur gear 16, sleeve 17, and said clutch-disk 19 to rotate freely on the shaft 18. According to Figure 2 of the drawings, the anvil 54 has just been withdrawn from the circular path of the projections 20a, 22a, and 47a, the clutch-ring 20 being thus released for a forward angular movement relatively to the clutch-part 22 under the tension of springs 25. Under this movement, the increasing angularity of the connecting links 23, cause an axial movement of the clutch-ring 20 into clutch with the clutch-disk. As shown clearly in Figures 10, 12 and 13, the locking bar 43 which is bolted to the clutch-ring 20, is moved toward the right according to these figures so that the inwardly-presented lug 45 carried thereby is moved out of the path of the stop 46 on the arcuate latch-plate 47 which is thus released and is immediately shifted by tension spring 51 from its position shown in Figure 10 to its position shown in Figure 5. By this shift of the arcuate latch-plate 47, the stop 46 is placed in a position to block the return movement of lug 45 and locking bar 43 until such time as the projections 20a, 22a, and 47a are again intercepted and brought into alinement by the anvil 54. As the continuously rotating clutch-disk becomes interlocked with the clutch-ring 20 and clutch-part 22, the lower cutter-shaft 18 is at first accelerated under the yieldable friction drive exerted through the spring-pressed straps 33 operating on the friction drum 30 during the movement of the driven segmental lug 29 from its central position in the arcuate slot 28 as shown in Figure 16 to the end of said arcuate slot as shown in Figure 15 after which the peripheral enlargement 27 of the clutch-part 22 exerts a rigid drive upon the lower cutter-shaft 18.

In the relative positions of the several parts shown in Figures 5 and 6, the rotary cutters mounted on the upper and lower cutter shafts 42 and 18 have completed their cutting operation and the clutch is about to be released for bringing the cutter shafts to rest. Thus, according to Figure 5, the latch plate 47 which is in locking position with respect to the latch bar 43 has reached a point in its rotation at which the projection 47a has come into engagement with the anvil 54. It will be seen, therefore, that as the lower cutter shaft continues to rotate, the latch plate 47 will first occupy the position shown in Figure 7, in which position the locking lug 46 has been removed from the path of the lug 45 and thus releases the locking bar 43. At about the same time, the projection 20a on the clutch ring 20 has come into engagement with the anvil 54 so that by the time that the projection 22a has come into engagement with the anvil 54, the clutch ring 20 has been moved rearwardly with respect thereto while the connecting links 23 have imparted a separating axial movement to the clutch ring 20 to disengage it from the clutch-disk 19. As the projection 22a of the intermediate member 22 comes into abutment with the anvil 54, the lower cutter shaft 18 is brought to rest under a braking action which continues during the movement of segmental lug 29 from its extreme position in the arcuate recess 28 as shown in Figure 15 to an approximately central position therein as shown in Figure 16. The parts are now arranged in their initial positions in readiness for another cycle of movements as described above.

I claim:—

1. In a clutch, the combination with driving and driven clutch-members provided with stop mechanism for normally holding said clutch members out of clutch, of latching mechanism under the control of said stop mechanism for locking said clutch-members together in clutched relation, said latching mechanism comprising a latch-bar mounted on one clutch-member part, and a latch-plate movable on another clutch-member part by said stop mechanism.

2. In a clutch, the combination with driving and driven clutch-members, one of said clutch members comprising parts, one of which is movable axially into and out of engagement with the other of said clutch-members, means for controlling the engagement and disengagement of said clutch-members, a locking bar carried by said axially movable clutch-part, and a latch-plate movable on the other of said clutch-parts into and out of locking engagement with said locking bar under the control of said controlling means.

3. In a device of the character described, the combination with a clutch-disk, of a clutch-ring movable axially into and out of engagement with said clutch-disk, a clutch-part rotatable with and movable angularly with respect to said clutch-ring, said clutch-disk being interposed between said clutch-ring and clutch-part, a latch-bar carried by and presented axially from said clutch-ring across said clutch-disk and clutch-part, a latch-plate movable on said clutch-part into and out of interlocking connection with said latch-bar, said latch-plate being provided with a radial projection, and a stop movable into and out of the path of said radial projection.

4. In a periodically operated clutch, the combination with a clutch-disk, of a clutch-member comprising axially-spaced parts, one of said parts being adapted to be moved into and out of engagement with said clutch-disk, a latch-bar carried by one of said axially-spaced parts, an arcuate latch-plate movable on the other of said axially-spaced parts into and out of interlocking engagement with said latch-bar for holding said one of the axially-spaced parts in engagement with said clutch-disk, means for yieldably holding said arcuate latch-plate in interlocking position with respect to said latch-bar, and a stop movable into and out of the rotary path of said latch-plate.

5. In a periodically operated clutch, the combination with a clutch-member comprising two axially-spaced parts, of a clutch-member interposed between said axially-spaced parts, said axially-spaced parts being adapted to engage and disengage said interposed clutch-member, a latch-bar rigidly mounted on and projecting axially from one of said clutch-member parts across the interposed clutch-member and the other of said clutch-member parts, an arcuate latch-plate movable on said other of the clutch-member parts into and out of interlocking engagement with said latch-bar, means for yieldably holding said arcuate latch-plate in interlocking position with respect to said latch-bar, said arcuate latch-plate being provided with a radial projection, and a stop movable into and out of the rotary path of said radial projection.

6. In a periodically operated clutch, the combination of a clutch-member comprising two axially-spaced parts adapted to engage and disengage an interposed clutch-member, an interposed clutch-member arranged between said axially-spaced parts for this purpose, a latch-bar rigidly mounted on one of said clutch-member parts, an arcuate latch-plate movable on the other of said clutch-member parts into and out of interlocking engagement with said latch-bar, said arcuate plate and latch-bar being provided with lugs adapted to interengage for holding said axially-spaced parts of the first-mentioned clutch-member in clutching engagement with said interposed clutch-member, means for yieldably holding said arcuate latch-plate in interlocking position with respect to said latch-bar, and stop mechanism normally holding said arcuate plate in release position.

7. In a periodically operated clutch, the combination of a clutch-member comprising two axially-spaced parts adapted to engage and disengage an interposed clutch-member, a clutch-member interposed between said axially-spaced parts, a latch-bar rigidly mounted on and projecting axially from one of said clutch-member parts, the other of said clutch-member parts being provided with an arcuate recess in a plane transverse to the axis of said clutch-members, an arcuate latch-plate movable endwise in said arcuate recess into and out of interlocking engagement with said latch-bar, and means for releasably holding said arcuate latch-plate in interlocking position with respect to said latch-bar.

8. In a periodically operated clutch, the combination with a clutch-member comprising two axially-spaced parts, of a clutch-member interposed between said axially-spaced parts and adapted to be engaged thereby, a latch-bar rigidly mounted on and projecting axially from one of said clutch-member parts, the other of said clutch-member parts being provided with an arcuate recess in a plane transverse to the axis of said clutch-members, an arcuate latch-plate movable endwise in said arcuate recess, said arcuate plate and latch-bar being provided with lugs adapted to interengage for holding said axially-spaced parts of the first-mentioned clutch-member in clutching engagement with said interposed clutch-member, means for yieldably holding said arcuate latch-plate in interlocking position with respect to said latch-bar, said arcuate latch-plate being provided with a radial projection, and a stop movable into and out of the rotary path of said radial projection.

9. In a clutch, the combination with driving and driven clutch-members, of means for imparting relative angular and axial movements to said clutch-members for throwing one of said clutch-members into and out of clutching engagement with the other, and means under the control of the first said means for latching said clutch-members together against relative axial movement at the end of their clutch-engaging movement and for releasing said clutch-members at the beginning of their declutching movement, said latching means comprising interlocking parts movable axially and angularly with respect to each other.

10. In a clutch, the combination with the axially-spaced parts of a two-part clutch-member, of a clutch-disk interposed between said axially-spaced parts, one of said axially-spaced parts being adapted by relative axial movements with respect to the other of said parts to engage and disengage said interposed clutch-disk, and a latch comprising members mounted respectively on the parts of said two-part clutch-member and adapted by relative axial and angular movements to interlock for holding said parts of the two-part clutch-member against relative axial movement.

11. In a clutch, the combination with a two-part clutch-member, of a latch-bar mounted on one of said parts of the two-part clutch-member, a latch-plate movable on the other of said parts of the two-part clutch-member, and a clutch-disk interposed between said clutch-member parts, one of said clutch-member parts being movable into and out of clutching engagement with said interposed clutch-disk, said latch-bar and latch-plate being adapted to releasably interlock in the clutched position of said clutch-member parts with respect to said interposed clutch-disk.

GEORGE W. SWIFT, Jr.